(No Model.)
E. BAILEY.
SHEARS OR SCISSORS.
No. 576,937. Patented Feb. 9, 1897.
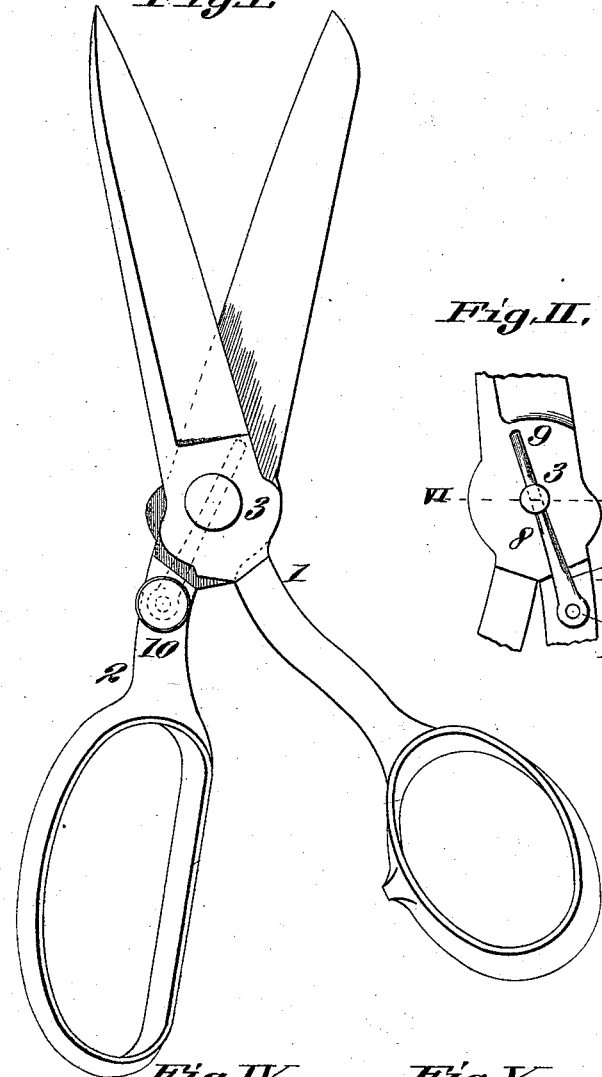
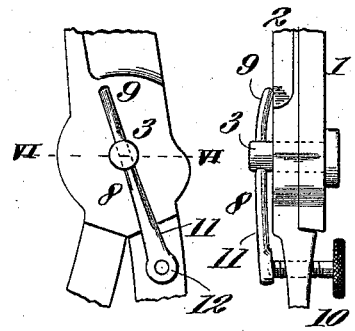
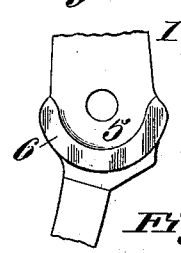
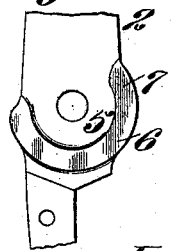
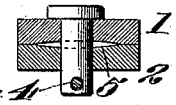
Attest:
B. L. Frederick
Stanley Stoner
Inventor:
Eli Bailey
By Wright Bro
Atty's

UNITED STATES PATENT OFFICE.

ELI BAILEY, OF KEOKUK, IOWA, ASSIGNOR, BY MESNE ASSIGNMENTS, OF TWO-THIRDS TO SARAH BAILEY, OF SAME PLACE.

SHEARS OR SCISSORS.

SPECIFICATION forming part of Letters Patent No. 576,937, dated February 9, 1897.

Application filed October 21, 1896. Serial No. 609,568. (No model.)

*To all whom it may concern:*

Be it known that I, ELI BAILEY, a citizen of the United States, residing at Keokuk, in the county of Lee, State of Iowa, have invented a certain new and useful Improvement in Shears or Scissors, of which the following is a full, clear, and exact description, reference being had to the accompanying drawings, forming part of this specification.

My present invention relates to an improvement on the class of shears or scissors set forth in my Patent No. 524,673, issued August 14, 1894.

My present invention consists in features of novelty hereinafter fully described, and pointed out in the claims.

Figure I is a plan view of a pair of shears or scissors embodying my invention. Fig. II is an enlarged detail view showing the central portion of the shears or scissors on the opposite side from that shown in Fig. I. Fig. III is a detail edge view. Fig. IV is a detail view showing the central part of one blade of the shears or scissors. Fig. V is a similar view of the other blade. Fig. VI is a transverse section taken on line VI VI, Fig. II.

Referring to the drawings, 1 represents one of the blades of the shears or scissors, and 2 the other blade. These blades are connected by a pin or pintle 3, that has an extended end in which is formed a perforation or hole 4. Each blade is provided with a cavity or recess 5, that partly surrounds the hole in which the pin 3 fits, as set forth in my patent referred to, and back of these recesses the blades are provided with semicircular raised bearing-surfaces 6. The object of these bearing-surfaces is set forth in the patent referred to, and they are substantially the same in this application as in said patent, except that the raised bearing-surface on the blade 2 is extended somewhat farther around than in the patent, as shown at 7, Fig. V. The object of this extension to the bearing-surface on the blade 2 is to provide a full bearing between the blades at the pivot when the blades are open.

The extension of the raised bearing on one blade should be sufficient in a direction concentric with the pivot to insure at all times at least a semicircular contact between the blades. The blades may have fully this amount of bearing without detracting from the cutting-bearing of either edge. By extending one of the bearings, as shown, and restricting the other to actually the extent of bearing desired and having this restricted bearing extending from the opposite ends of a transverse line through the pivot of the shears the exact bearing will be maintained at all times.

8 represents a lever fitting in the perforation 4 in the pin 3. This lever is preferably made of spring metal, and its end 9 is turned downward, so as to bear against the blade 2 forward of the pivot-pin 3.

10 represents a thumb-screw tapped into the blade 2 back of the pivot-pin 3 and the end of which bears against the end 11 of the lever 8, this end of the lever being preferably provided with a perforation 12 to receive the end of the screw.

In putting the blades together the pin 3 is simply slipped into place and the lever 8 then inserted through the perforation 4 and the thumb-screw tightened against the end 11 of the lever. This draws the pin 3 up tight and the blades are thus held against each other, and any desired tightness may be obtained by simply adjusting the screw, and any wear between the blades is compensated for by adjusting the screw.

I claim as my invention—

1. A pair of scissors, the blades of which are provided with recesses around the pivot, each blade having a raised bearing-surface, the bearing-surface on one blade terminating at the opposite ends of a transverse line through the pivot and thereby extending for a distance of one-half a circle concentric with the pivot and the other raised bearing extending in a concentric direction beyond the semicircle a distance equal to the movement of the upper bearing in the widest opening of the scissors, as explained.

2. A pair of shears comprising blades having recesses about their pivot and having raised bearing-surfaces back of the pivot one of which is a semicircle and the other of which extends on one side beyond the semicircle a distance sufficient to maintain the semicircular bearing at all angles of opening, a pivot-pin having a perforated end, a lever extending through the perforation in said pivot and
5 bearing at one end on the blade having a semicircular bearing and a set-screw in the shank of the said blade, which has the semicircular bearing and putting tension on said lever, substantially as and for the purpose set forth.

ELI BAILEY.

In presence of—
   GEO. H. KNIGHT,
   B. L. FREDERICK.